US008727421B2

(12) United States Patent
Cohoon et al.

(10) Patent No.: US 8,727,421 B2
(45) Date of Patent: May 20, 2014

(54) DOOR BEAM ASSEMBLY WITH ROLL FORMED BEAM

(75) Inventors: Aimee N. Cohoon, Spring Lake, MI (US); Corey J. Hoff, Nunica, MI (US)

(73) Assignee: Shape Corp., Grand Haven, MI (US)

( * ) Notice: Subject to any disclaimer, the term of this patent is extended or adjusted under 35 U.S.C. 154(b) by 2 days.

(21) Appl. No.: 13/596,853

(22) Filed: Aug. 28, 2012

(65) Prior Publication Data

US 2013/0049397 A1   Feb. 28, 2013

Related U.S. Application Data

(60) Provisional application No. 61/529,391, filed on Aug. 31, 2011.

(51) Int. Cl.
*B60J 5/00* (2006.01)
*B60J 5/04* (2006.01)

(52) U.S. Cl.
USPC ...................................................... 296/146.6

(58) Field of Classification Search
USPC ............... 296/146.6, 146.2, 187.12; 293/121; 180/282, 735; 49/502
See application file for complete search history.

(56) References Cited

U.S. PATENT DOCUMENTS

| 2,827,315 | A | | 11/1954 | Nock et al. |
|---|---|---|---|---|
| 4,090,734 | A | | 5/1978 | Inami et al. |
| 4,599,843 | A | | 7/1986 | Ingvarsson |
| 4,708,390 | A | | 11/1987 | Palentyn et al. |
| 5,080,427 | A | | 1/1992 | Sturrus et al. |
| 5,092,512 | A | | 3/1992 | Sturrus et al. |
| 5,123,694 | A | | 6/1992 | DePierre et al. |
| 5,232,261 | A | | 8/1993 | Kuroda et al. |
| 5,370,437 | A | | 12/1994 | Alberda |
| 5,404,690 | A | | 4/1995 | Hanf |
| 5,454,504 | A | | 10/1995 | Sturrus |
| 5,544,930 | A | * | 8/1996 | Stedman ..................... 296/146.6 |
| 5,573,298 | A | * | 11/1996 | Walker et al. ............. 296/187.12 |
| 5,580,120 | A | * | 12/1996 | Nees et al. ................. 296/146.6 |
| 5,800,007 | A | | 9/1998 | Cho |
| 5,813,719 | A | | 9/1998 | Kowalski |
| 5,868,456 | A | | 2/1999 | Kowalski et al. |
| 6,020,039 | A | | 2/2000 | Cline et al. |
| 6,050,049 | A | | 4/2000 | Kowalski et al. |
| 6,053,565 | A | * | 4/2000 | Cho .......................... 296/187.12 |
| 6,082,811 | A | | 7/2000 | Yoshida |
| 6,135,541 | A | | 10/2000 | Geise et al. |
| 6,382,707 | B1 | | 5/2002 | Dunneback |

(Continued)

FOREIGN PATENT DOCUMENTS

| FR | 2692848 | 12/1993 |
|---|---|---|
| JP | 06072152 | 3/1994 |
| JP | 06106978 | 4/1994 |

*Primary Examiner* — Glenn Dayoan
*Assistant Examiner* — Sunsurraye Westbrook
(74) *Attorney, Agent, or Firm* — Price Heneveld LLP

(57) ABSTRACT

A door beam assembly for a passenger vehicle comprises a roll formed longitudinally-swept tubular beam having a constant cross section defining a generally-orthogonal shape, with the outside wall having an integral channel rib formed into the wall to stiffen the wall. C-shaped mounting brackets are attached to beam ends, with opposing walls welded to and supporting walls of the beam, and with a transverse wall spaced from the adjacent wall of the beam. In one aspect, right and left door beam assemblies includes identical beams, front and rear mounting brackets attached to each end, and identical center brackets.

9 Claims, 4 Drawing Sheets

(56) References Cited

U.S. PATENT DOCUMENTS

| | | |
|---|---|---|
| 6,390,534 B1 | 5/2002 | Lee et al. |
| 6,454,884 B1 | 9/2002 | McNulty et al. |
| 6,557,318 B2 | 5/2003 | Graber |
| 6,575,525 B2 | 6/2003 | Traister et al. |
| 6,591,577 B2 | 7/2003 | Goto et al. |
| 6,622,450 B2 | 9/2003 | Nees et al. |
| 6,817,652 B2 * | 11/2004 | Graber et al. ............... 296/146.6 |
| 6,824,198 B2 | 11/2004 | Sakuma et al. |
| 6,846,033 B2 | 1/2005 | Chu et al. |
| 6,908,141 B2 | 6/2005 | Doi et al. |
| 6,918,224 B2 | 7/2005 | Tjoelker et al. |
| 6,957,844 B2 | 10/2005 | Chu et al. |
| 7,014,249 B2 | 3/2006 | Karuppaswamy et al. |
| 7,316,446 B2 * | 1/2008 | Wikstrom ................... 296/146.6 |
| 7,325,862 B2 | 2/2008 | Rieder et al. |
| 7,347,486 B2 | 3/2008 | Uchida et al. |
| 7,401,847 B2 | 7/2008 | Kidachi et al. |
| 7,497,504 B2 | 3/2009 | Peters et al. |
| 7,631,925 B2 | 12/2009 | Tanaka et al. |
| 7,637,555 B2 * | 12/2009 | Kameoka ................... 296/146.6 |
| 7,648,191 B2 | 1/2010 | Sakamoto et al. |
| 2009/0026795 A1 | 1/2009 | Tate |
| 2010/0090495 A1 | 4/2010 | Suzuki |
| 2010/0230997 A1 | 9/2010 | Buschsieweke et al. |
| 2010/0242284 A1 | 9/2010 | Danaj et al. |
| 2010/0301630 A1 | 12/2010 | Ohta et al. |

\* cited by examiner

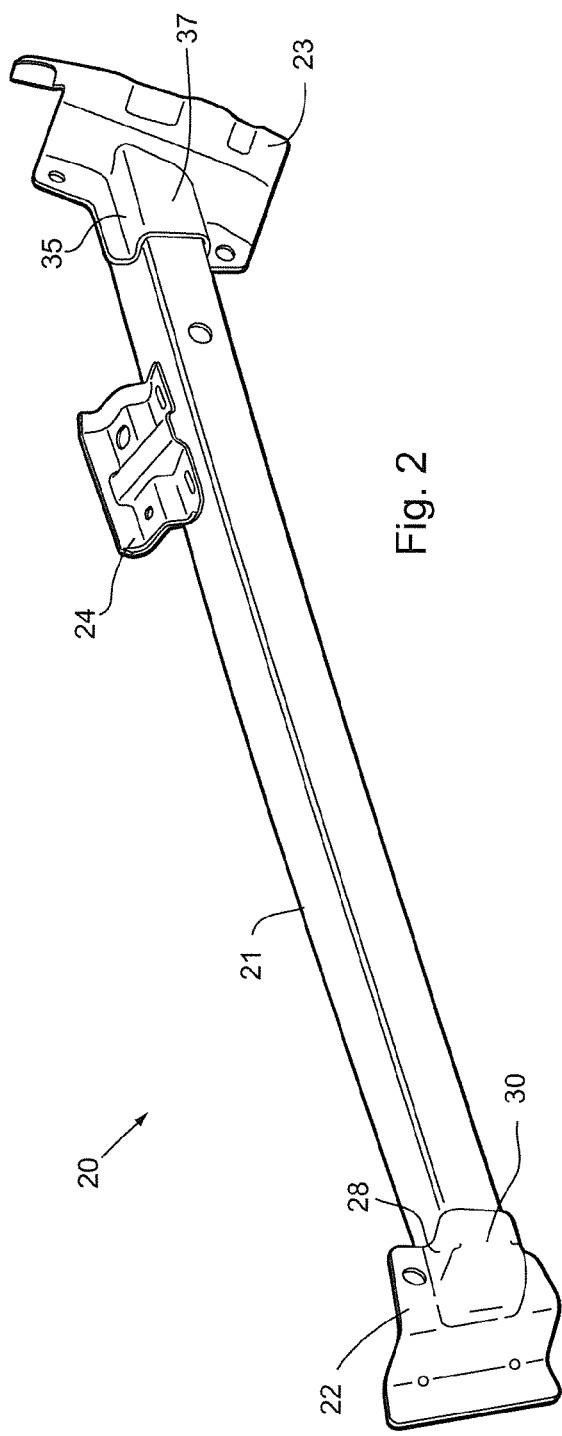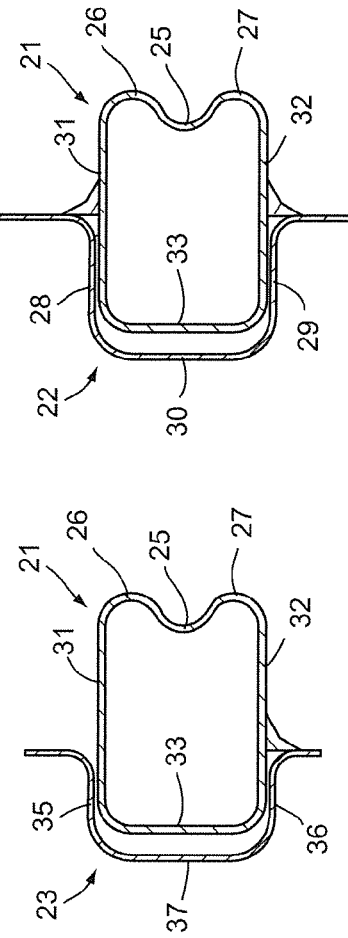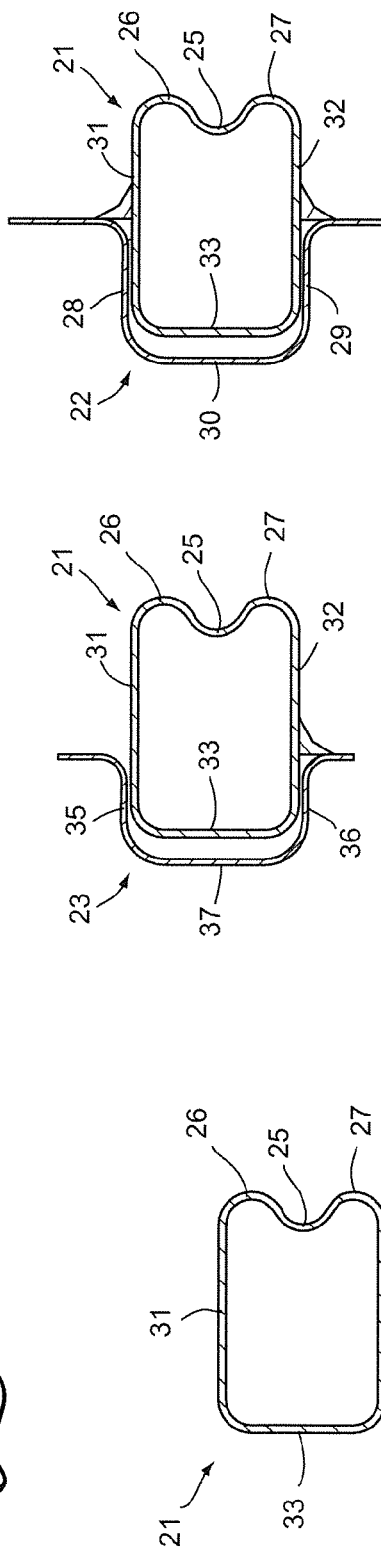

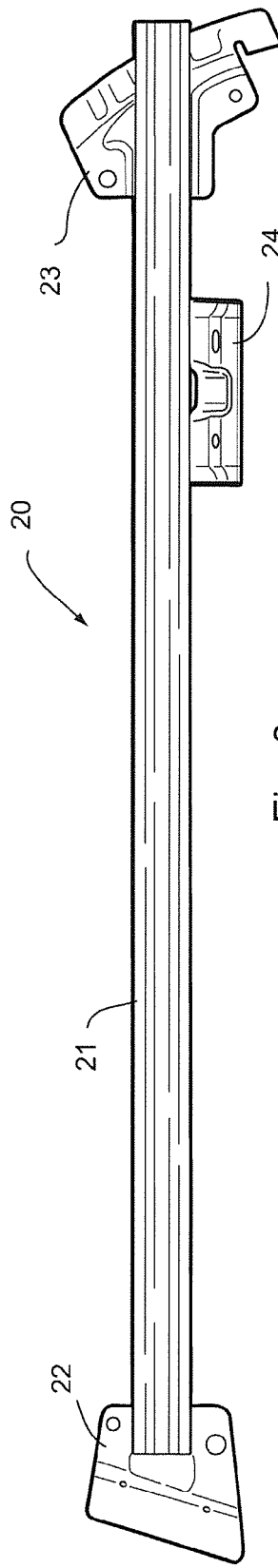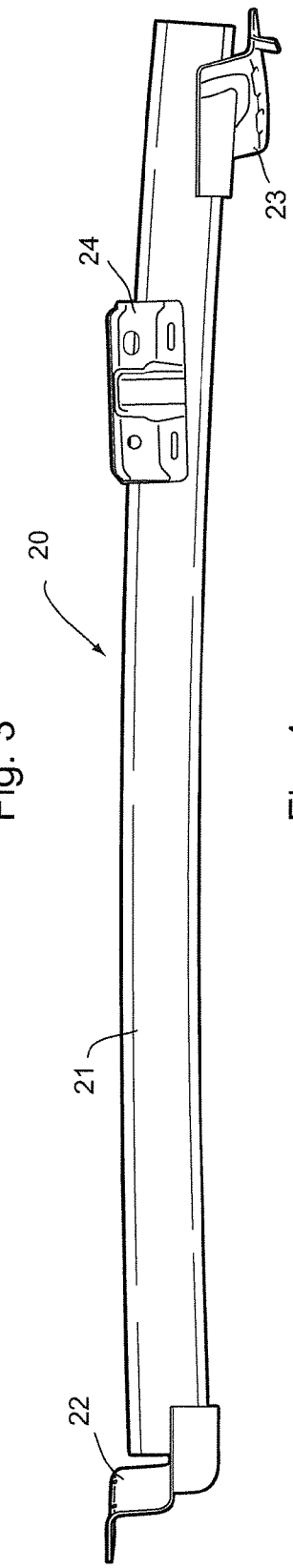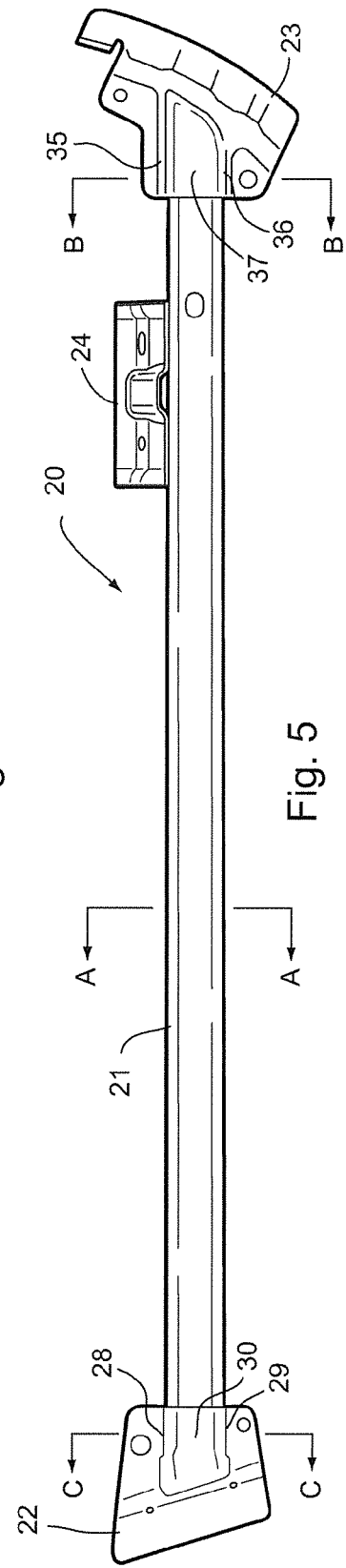

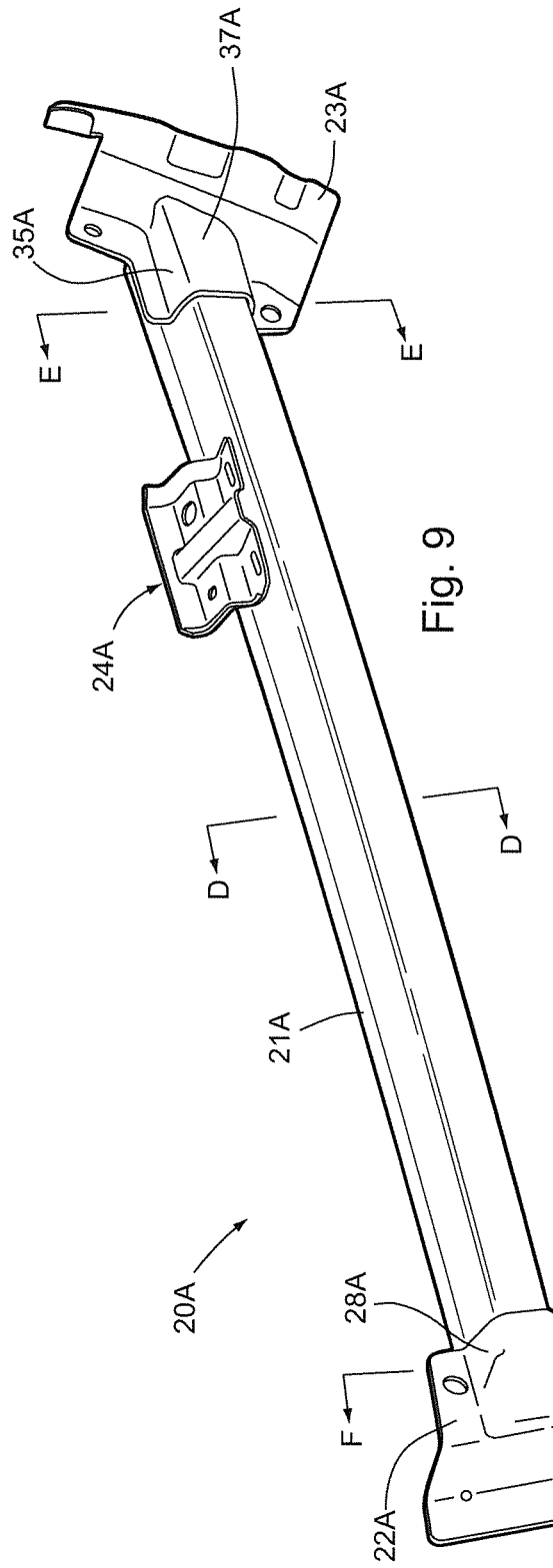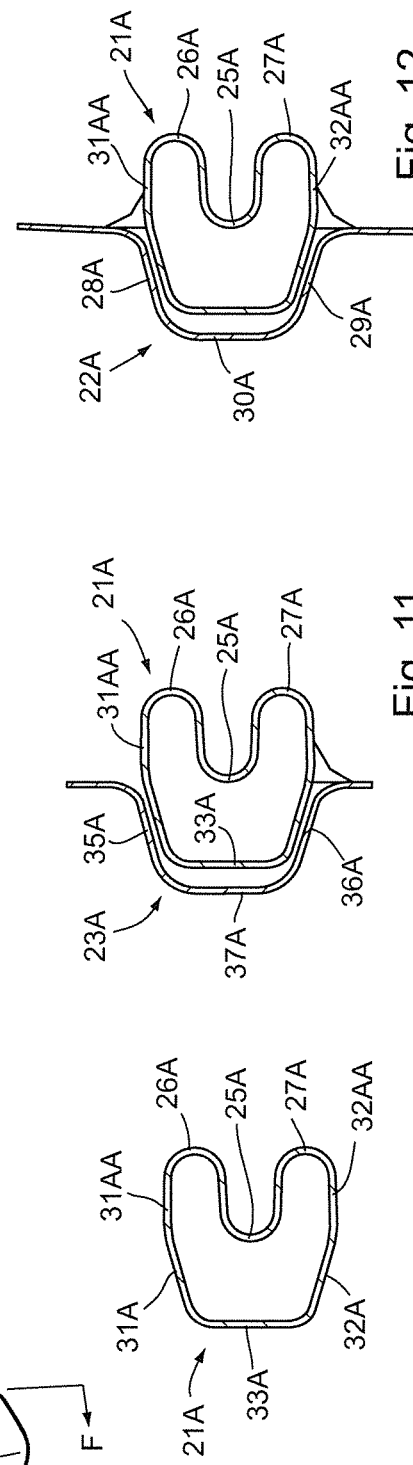

DOOR BEAM ASSEMBLY WITH ROLL FORMED BEAM

CROSS-REFERENCE TO RELATED APPLICATION

This application claims benefit under 35 USC §119(e) of provisional application Ser. No. 61/529,391, filed Aug. 31, 2011, entitled DOOR BEAM ASSEMBLY WITH ROLL FORMED BEAM the entire contents of which are incorporated herein by reference.

BACKGROUND

The present invention relates to door beam assemblies used in modern passenger vehicles to provide side impact resistance during a vehicle crash.

Many door beam assemblies exist for providing side impact strength in passenger vehicles. However, improvements are desired to reduce cost, reduce weight, increase impact strength, maintain consistency and repeatability of energy absorption during an impact (i.e. the beam's force-deflection curve), improve manufacturability including reducing secondary manufacturing operations, and improve assemble-ability. This is not easily accomplished given many conflicting requirements, including the need to stay within a desired package space and to provide mounting brackets on ends of the beam and along sides the beam for both right-side and left-side vehicle components.

SUMMARY OF THE PRESENT INVENTION

In one aspect of the present invention, a door beam assembly for a passenger vehicle comprises a tubular beam having a constant cross section, the constant cross section having top, inside, outside, and bottom walls generally defining a non-circulate tubular shape, at least one of the inside and outside walls having an integral rib formed therein that adds stiffness to the one wall, and including mounting brackets on ends of the tubular beam for attaching the tubular beam to a door assembly.

In another aspect of the present invention, a door beam assembly for a passenger vehicle comprises a tubular beam having a constant cross section, the constant cross section having top, inside, outside, and bottom walls; and mounting brackets attached to ends of the tubular beam, the mounting brackets having opposing walls welded to the top and bottom walls and having a transverse wall connecting the opposing walls that is spaced from the inside wall.

In another aspect of the present invention, a door beam assembly for a passenger vehicle comprises a tubular beam having a constant cross section and longitudinal curve, the constant cross section having top, inside, outside, and bottom walls; and mounting brackets on ends of the tubular beam, the mounting brackets having opposing walls welded to and supporting the top and bottom walls.

In another aspect of the present invention, a set of door beam assemblies for a passenger vehicle comprises right and left door beam assemblies, each including a beam having a continuous cross section, front and rear mounting brackets attached to each end, and a center bracket; at least one of the beam, the front and rear mounting brackets and the center bracket being identical on each of the right and left door beam assemblies.

Methods related to the above also form a part of the present invention.

These and other aspects, objects, and features of the present invention will be understood and appreciated by those skilled in the art upon studying the following specification, claims, and appended drawings.

BRIEF DESCRIPTION OF DRAWINGS

FIGS. 2-5 are perspective, outside, top and inside views.

FIGS. 6-8 are cross sections taken along lines A-A, B-B, C-C in FIG. 5.

FIG. 9 is a perspective view of a modified door beam assembly similar to FIG. 1.

FIGS. 10-12 are cross sections taken along lines D-D. E-E, and F-F in FIG. 9.

DETAILED DESCRIPTION OF PREFERRED EMBODIMENTS

Figure 1:
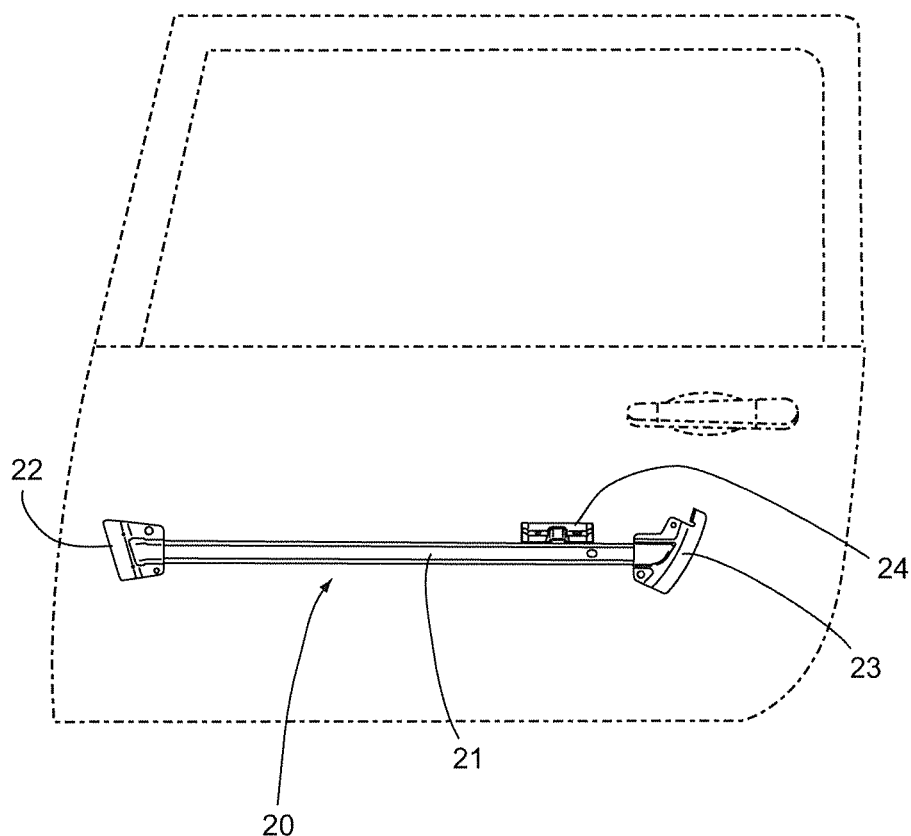
FIG. 1 is a side view of a door beam assembly embodying the present invention and shown on a door (in dashed lines to show environment).

A door beam assembly 20 (FIG. 1) is provided for mounting inside the door of a passenger vehicle. The assembly 20 comprises a roll formed longitudinally-swept tubular beam 21 having walls 26-27, 31-33 forming a constant cross section defining a generally orthogonal rectangular shape, with the outside/exterior wall 25-27 having an integral channel rib 26 formed to stiffen the wall. C-shaped mounting brackets 22, 23 are attached to beam ends with opposing walls 28, 29 on bracket 22 being welded to and supporting top and bottom walls 31, 32 of the beam 21, and with a transverse wall 30 being spaced from the adjacent inside wall 33 of the beam 21, and with opposing walls 35, 36 on bracket 23 being welded to and supporting top and bottom walls 31, 32 of the beam 21, and with a transverse wall 37 being spaced from the adjacent inside wall 33 of the beam 21. A center bracket(s) 24 is welded to one of the walls, such as the bottom wall 32. In one aspect, right and left door beam assemblies (20) include identical beams 21 and an identical center bracket 24, and different front and rear mounting brackets 22, 23 attached to beam ends.

The illustrated beam 21 is roll formed of a high strength steel material, such as a tensile strength of about 450-550 MPa (80-100 ksi) and a thickness of 1.6-3 mm thickness. However, it is contemplated that other materials of higher or lower strength and/or higher or lower thicknesses can be used, depending on functional requirements. For example, an ultra high strength steel material could be used having a tensile strength of 1500 MPa (270+ksi) and thickness of less than 1 mm (such as 0.8 mm) for an extra high strength and low weight. A rectangular cross sectional shape defined by the walls 22-25 of the beam 21 allows it to be roll formed using a process not unlike that shown in Sturrus U.S. Pat. Nos. 5,092, 512 and 5,454,504, the entire contents of which are incorporated herein for their teachings. The longitudinal curvature (i.e. "sweep") in the illustrated beam 21 is relatively small, but it is contemplated that beams can be made less curved or more curved, depending on a vehicle's design.

A shape of the beam 21 as used in a door beam is believed to be novel, unobvious, and patentable. Specifically, the rectangular cross sectional shape of the beam 21 is believed to be unusual for door beams, in that it is about 45 mm deep (in a cross car direction) and about 31 mm high (in a vertical direction), and it includes an inboard/inside wall 25-27 formed by three curves. The three curves include the channel rib 25 in a center location and two protruding radiused sections 26, 27 on each side of the channel rib 25. The illustrated protruding sections 26, 27 define a radius of about 5-7 mm, and the illustrated channel rib 25 has a radius of slightly less than 5 mm and slightly less than 180 degrees. However, it is contemplated that the protruding sections and channel rib may have alternative shapes and sizes, depending on functional requirements of a particular door beam assembly. Testing has shown that the channel rib 25 stiffens and stabilizes the inside wall 26, 27 and generally stabilizes the beam 21, resulting in improved impact strength and energy-absorbing characteristics, particularly with the ultra-high strength materials and thin materials used in the illustrated beam 21.

The illustrated beam assembly 20 is for a left driver-side vehicle door, but persons skilled in the art will recognize that a right passenger-side vehicle door can be constructed using parts to form a mirror image. Artisans will also recognize that the right vehicle door can use an identical beam 21 and an identical center bracket 24 if desired.

The brackets 22-24 are formed from a stampable steel material, such as a steel sheet having tensile strengths much lower than that used for beam 21. The illustrated brackets 22, 23 each have a U-shaped portion that engages the beam 21, and a Z-shaped attachment flange extending from the U-shaped portion with bolt-receiving apertures for attachment to a door frame on the vehicle door. The U-shaped portion includes opposing walls 28, 29 and transverse wall 30. The walls 28 and 29 lie adjacent the top and bottom walls 23, 24 of the beam 21 and are welded to them. The transverse wall 30 is spaced from the adjacent inside wall 22 of the beam 21, such as to define a gap of about 4 mm. This facilitates secondary assembly, and adds to the overall impact strength and consistency of impact strength and energy-absorbing capability of the present door beam assembly 20. The attachment flange is configured to matingly engage mating material on the door frame and can include weld pad areas or apertures for fastener attachment as required.

A modified door beam assembly 20A (FIGS. 9-12) is provided for mounting inside the door of a passenger vehicle. The assembly 20A comprises a roll formed longitudinally-swept tubular beam 21A having walls 26A-27A, 31A, 31AA, 32A, 32AA, and 33A forming a constant cross section defining a generally horseshoe-like shape, with the outside/exterior wall 26A-27A having an integral channel rib 25A formed to stiffen the wall. The top wall 31A, 31AA includes a horizontal wall section 31AA and an angled wall section 31A. Similarly, the bottom wall 32A, 32AA includes a horizontal wall section 32AA and an angled wall section 32AA. The channel 25A is relatively deep, such as about ½ of the total dimension of its cross sectional shape. The horizontal wall portions 31AA and 32AA extend generally parallel each other on opposing sides of the deep channel rib 25A. The angled wall sections 31A and 32A extend toward each other slightly from horizontal wall sections 31AA and 32AA and connect to the wall section 33A with relatively small radius (as compared to the radius of the channel rib 25A and the radii of walls 25A, 27A. A cross sectional shape of the beam 21A along with the deep channel rib 25A and with angled wall portions 31A, 32A provides a door beam 21A having optimal impact and energy-absorbing characteristics, including quick initial resistance to bending during an impact, a continued high level of resistance to bending during continued impact stroke (during which time a substantial amount of energy is absorbed into the beam), and a more predictable collapse and predictable energy-absorption during failure (when the beam begins permanent deformation with its walls bending and crushing along multiple deformation lines).

C-shaped mounting brackets 22A, 23A are attached to beam ends, with opposing walls 28A, 29A on bracket 22A being welded to and supporting top and bottom walls 31A, 31AA, 32A, 32AA of the beam 21A, and with a transverse wall 30A being spaced from the adjacent inside wall 33A of the beam 21A, and with opposing walls 35A, 36A on bracket 23A being welded to and supporting top and bottom walls 31A, 31AA, 32A, 32AA of the beam 21A, and with a transverse wall 37A being spaced from the adjacent inside wall 33A of the beam 21A. A center bracket(s) 24A is welded to one of the walls, such as the bottom wall 32A. In one aspect, right and left door beam assemblies (20A) include identical beams 21A and an identical center bracket 24A, and different front and rear mounting brackets 22A, 23A attached to beam ends.

It is to be understood that variations and modifications can be made on the aforementioned structure without departing from the concepts of the present invention and further it is to be understood that such concepts are intended to be covered by the following claims unless these claims by their language expressly state otherwise.

The embodiments of the invention in which an exclusive property or privilege is claimed are defined as follows:

1. A door beam assembly for a passenger vehicle, comprising:
   a tubular beam having a constant cross section, the constant cross section having top, inside, outside, and bottom walls generally defining a non-circular tubular shape with at least three walls having planar portions defining a first rectangular C-shape, at least one of the inside and outside walls having an integral rib formed therein that adds stiffness to the one wall, and including mounting brackets on ends of the tubular beam for attaching the tubular beam to a door assembly, the mounting brackets including opposing and transverse walls defining a second rectangular C-shape that mates with the first rectangular C-shape, with the opposing walls engaging and being welded to the mating top and bottom walls but with the transverse wall being spaced from an adjacent one of the walls of the beam to facilitate assembly.

2. The door beam assembly defined in claim 1, wherein the rib is a channel rib.

3. The door beam assembly defined in claim 2, wherein the channel rib has a depth extending at least greater than ⅓ of a total depth of the tubular beam.

4. The door beam assembly defined in claim 3, wherein the cross section includes wall portions forming an orthogonal shape.

5. The assembly defined in claim 1, wherein the beam has a longitudinal curvature.

6. The door beam assembly for a passenger vehicle, comprising:
   a tubular beam having a constant cross section and a length that defines a longitudinal curvature, the constant cross section having top, inside, outside, and bottom walls generally defining a non-circular tubular shape, the top, inside and bottom walls including planar sections but the outside wall having an integral rib formed therein that adds stiffness to the one wall, and including mounting brackets on ends of the tubular beam for attaching the tubular beam to a door assembly.

7. The assembly defined in claim 6, wherein the brackets include opposing walls and a transverse wall defining a C-shape, and with only the opposing walls welded to the beam.

8. The assembly defined in claim 7, wherein the transverse wall is spaced from an adjacent one wall of the beam.

9. The door beam assembly for a passenger vehicle, comprising:

a tubular beam having a constant cross section, the constant cross section having top, inside, outside, and bottom walls generally defining a non-circular tubular shape with at least the top and bottom walls including planar portions defining part of a rectangular shape, at least one of the inside and outside walls having an integral rib formed therein that adds stiffness to the one wall, and including mounting brackets on ends of the tubular beam for attaching the tubular beam to a door assembly, and further including a center bracket welded to an intermediate portion of the beam, the mounting brackets and center bracket each being welded only to the top and bottom walls and each defining a gap to an adjacent one of the inside and outside walls.

* * * * *